United States Patent
Takamiya

(10) Patent No.: US 8,271,180 B2
(45) Date of Patent: Sep. 18, 2012

(54) INTAKE CONTROL SYSTEM AND METHOD FOR INTERNAL COMBUSTION ENGINE

(75) Inventor: Hideharu Takamiya, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 12/752,199

(22) Filed: Apr. 1, 2010

(65) Prior Publication Data
US 2010/0274466 A1     Oct. 28, 2010

(30) Foreign Application Priority Data
Apr. 22, 2009   (JP) .................................. 2009/104557

(51) Int. Cl.
*F02D 13/00* (2006.01)
*F02D 13/02* (2006.01)
(52) U.S. Cl. ...................................... 701/103; 123/345
(58) Field of Classification Search .................. 701/101, 701/102, 103; 123/345–348, 90.15, 90.16; 73/114.31
See application file for complete search history.

(56) References Cited

U.S. PATENT DOCUMENTS

| | | | |
|---|---|---|---|
| 6,863,050 B2* | 3/2005 | Iizuka et al. | 123/345 |
| 7,017,551 B2* | 3/2006 | Shimizu | 123/399 |
| 7,676,319 B2* | 3/2010 | Hano et al. | 701/103 |
| 2004/0007194 A1* | 1/2004 | Iizuka et al. | 123/90.15 |
| 2004/0015287 A1* | 1/2004 | Ilzuka et al. | 701/102 |
| 2004/0182341 A1 | 9/2004 | Machida et al. | |
| 2005/0205055 A1* | 9/2005 | Shimizu | 123/346 |
| 2009/0018754 A1* | 1/2009 | Hano et al. | 701/103 |

FOREIGN PATENT DOCUMENTS

| | | |
|---|---|---|
| EP | 1 662 118 A1 | 5/2006 |
| JP | 2002-303163 A | 10/2002 |
| JP | 2005-171910 A | 6/2005 |
| JP | 2007-064022 A | 3/2007 |
| JP | 2008-196474 A | 8/2008 |
| JP | 2008-223724 A | 9/2008 |

* cited by examiner

*Primary Examiner* — Mahmoud Gimie
(74) *Attorney, Agent, or Firm* — Arent Fox LLP

(57) ABSTRACT

An intake control system for an internal combustion engine, which is capable of suppressing a change in an intake pressure caused by a change in a target intake air amount even in a transient operating condition in which the target intake air amount is varied, thereby making it possible to control the intake pressure stably and accurately. The intake control system controls an intake air amount by an intake valve lift, and controls intake negative pressure by a throttle valve. The system limits a target intake air amount based on upper and lower limit values set according to the intake valve lift and an intake cam phase, and corrects the target intake air amount by averaging the same using averaging calculation such that the change therein is delayed. A throttle valve opening is set according to the corrected target intake air amount.

12 Claims, 10 Drawing Sheets

F I G. 1
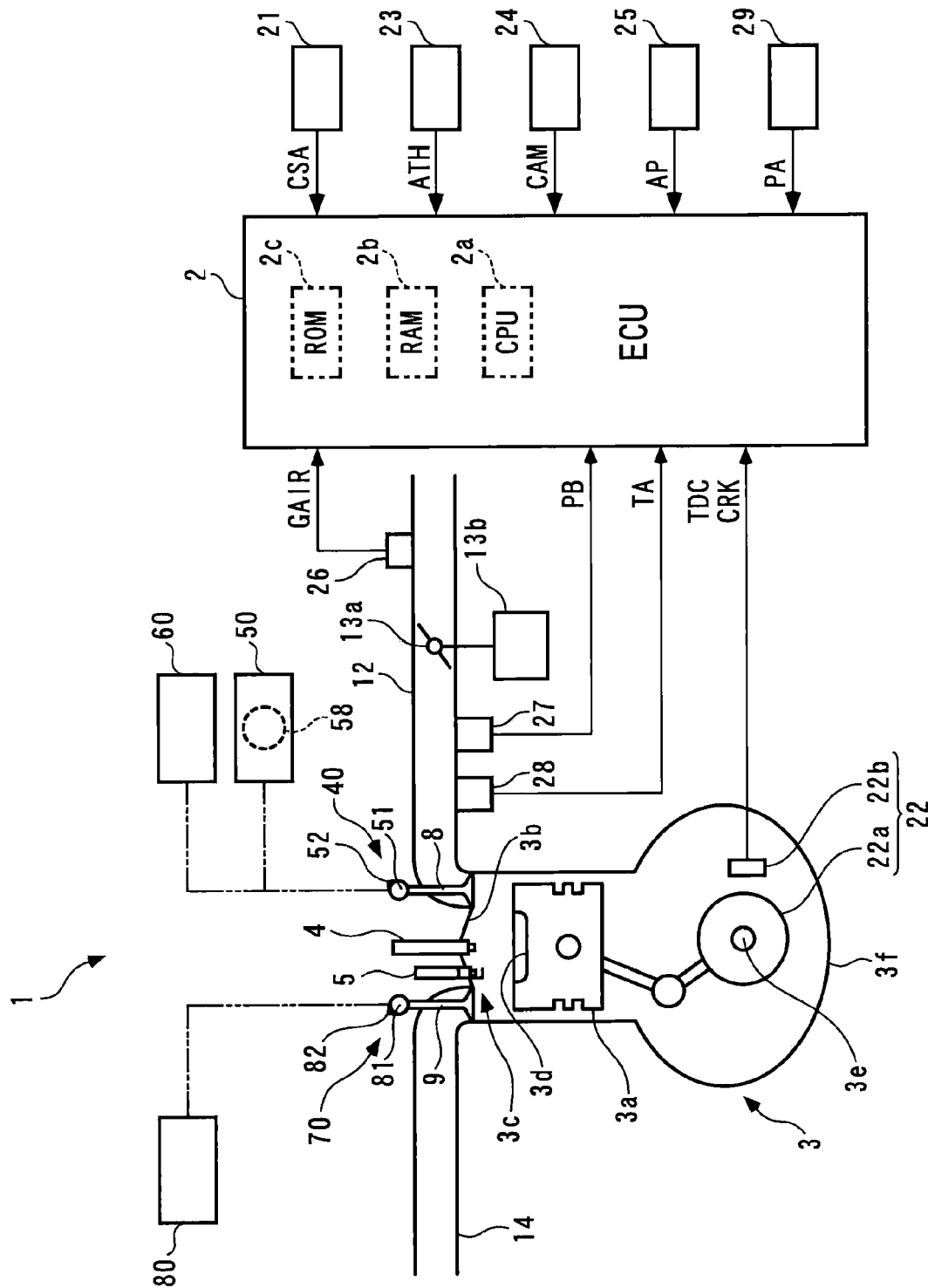

INTAKE CONTROL SYSTEM AND METHOD FOR INTERNAL COMBUSTION ENGINE

BACKGROUND OF THE INVENTION

1. Field of the Invention

The present invention relates to an intake control system and method for an internal combustion engine, for adjusting an intake air amount by changing the lift of an intake valve using a variable intake lift mechanism, and adjusting intake pressure using a throttle valve.

2. Description of the Related Art

Conventionally, there is known an intake control system for an internal combustion engine as disclosed e.g. in Japanese Laid-Open Patent Publication (Kokai) No. 2008-196474. The internal combustion engine is equipped with a variable intake lift mechanism for adjusting an intake air amount by continuously changing the lift of an intake valve, and a throttle valve for adjusting intake pipe pressure by changing the opening of the throttle valve. In the intake control system, a target intake air amount is calculated according to operating conditions of the engine, and based on the calculated target intake air amount, the lift of the intake valve is changed, whereby the intake air amount is controlled. Further, the opening of the throttle valve is set according to the target intake air amount to thereby secure the target intake air amount. Further, the intake pipe pressure (absolute pressure) on the downstream side of the throttle valve and atmospheric pressure are detected, and an intake pipe gauge pressure is calculated based on the detected intake pipe pressure and atmospheric pressure. Then, the opening of the throttle valve is corrected by feedback control such that the gauge pressure becomes equal to a target gauge pressure, whereby the intake pressure is controlled.

In the conventional intake control system, however, when the target intake air amount is changed, there occurs an inevitable delay before the intake air amount actually becomes equal to the target intake air amount. On the other hand, the opening of the throttle valve is basically set according to the target intake air amount. Therefore, especially during a transient operation of the engine in which the target intake air amount is largely varied, the delay of the actual intake air amount from the target intake air amount has such an influence on the intake pressure to change the same. Since the opening of the throttle valve is corrected such that the changed intake pressure becomes equal to the target gauge pressure, it is impossible to accurately control the gauge pressure to the target gauge pressure.

SUMMARY OF THE INVENTION

It is an object of the present invention to provide an intake control system and method for an internal combustion engine, which are capable of suppressing a change in intake pressure caused by a change in a target intake air amount, even in a transient operating condition of the engine in which the target intake air amount is varied, thereby making it possible to control the intake pressure stably and accurately.

To attain the above object, in a first aspect of the present invention, there is provided an intake control system for an internal combustion engine, comprising a variable intake lift mechanism that adjusts an intake air amount by changing a lift of an intake valve, a throttle valve that is disposed in an intake passage, for adjusting intake pressure by changing an opening of the throttle valve, operating condition-detecting means for detecting operating conditions of the engine, target intake air amount-setting means for setting a target intake air amount serving as a target of the intake air amount according to the detected operating conditions of the engine, correction means for correcting the set target intake air amount such that a change in the target intake air amount is delayed, and throttle valve opening-setting means for setting the opening of the throttle valve according to the corrected target intake air amount.

In the engine, the variable intake lift mechanism controls the intake air amount by changing the lift of the intake valve, and the throttle valve controls the intake pressure by changing the opening of thereof. Further, with the configuration of the intake control system for the engine, the target intake air amount that serves as the target of the intake air amount is set according to the detected operating conditions of the engine, and the set target intake air amount is corrected such that the change in the target intake air amount is delayed. Further, the opening of the throttle valve is set according to the corrected target intake air amount.

As described above, according to the first aspect of the present invention, the target intake air amount set according to the operating conditions of the engine is corrected such that the change in the target intake air amount is delayed, and the opening of the throttle valve is set according to the corrected target intake air amount. Therefore, when the target intake air amount is changed, it is possible to suppress a change in the intake pressure caused by a delay of the actual intake air amount from the target intake air amount. This makes it possible to suppress a change in the intake pressure caused by the change in the target intake air amount even in a transient operating condition of the engine in which the target intake air amount is varied, thereby making it possible to control the intake pressure stably and accurately.

Preferably, the intake control system further comprises lift-detecting means for detecting a lift of the intake valve, and the correction means comprises limit value-setting means for setting a limit value which is at least one of an upper limit value and a lower limit value of the target intake air amount according to the detected lift of the intake valve, and limiting means for limiting the target intake air amount based on the set limit value.

With the configuration of this preferred embodiment, the target intake air amount is corrected by being limited based on the limit value which is at least one of the upper limit value and the lower limit value of the target intake air amount, so that the target intake air amount is prevented from being set to a too large or a too small value to avoid a large change in the target intake air amount, whereby it is possible to effectively delay the change in the target intake air amount. Further, when the lift of the intake valve is changed according to the change in the target intake air amount, the delay of the actual intake air amount from the target intake air amount varies with the lift of the intake valve. According to this preferred embodiment, the limit value of the target intake air amount is set according to the detected lift of the intake valve. Therefore, the target intake air amount can be properly limited and corrected according to the change in the delay of the actual intake air amount from the target intake air amount, caused by the lift of the intake valve.

More preferably, the intake control system further comprises a variable intake cam phase mechanism for changing a cam phase of an intake cam that actuates the intake valve, with respect to a crankshaft, and cam phase-detecting means for detecting the cam phase, and the limit value-setting means sets the limit value further according to the detected cam phase.

With the configuration of this preferred embodiment, the variable intake cam phase mechanism changes the cam phase of the intake cam that actuates the intake valve with respect to the crankshaft. Further, the limit value of the target intake air amount is set according not only to the lift of the intake valve but also to the detected cam phase. When the cam phase is changed, the charging efficiency of intake air of the engine is changed by the change in the cam phase, and further the change in the charging efficiency changes the delay of the actual intake air amount from the target intake air amount as well. According to this preferred embodiment, the limit value of the target intake air amount is set according not only to the lift of the intake valve but also to the cam phase. Therefore, it is possible to limit and correct the target intake air amount more properly.

More preferably, the correction means further includes averaging means for averaging the target intake air amount by averaging calculation.

With the configuration of this preferred embodiment, the target intake air amount is corrected by being averaged by averaging calculation. This prevents a sudden change in the target intake air amount, whereby it is possible to effectively delay the change in the target intake air amount.

Further preferably, the intake control system further comprises target lift-setting means for setting a target lift that serves as a target of the lift of the intake valve, and feedback means for feedback-controlling the lift of the intake valve using a response characteristic value representative of a predetermined response characteristic, such that the lift of the intake valve becomes equal to the set target lift, and the averaging means sets an averaging coefficient for the averaging calculation, using the response characteristic value.

With the configuration of this preferred embodiment, the lift of the intake valve is feedback-controlled using the response characteristic value representative of the predetermined response characteristic such that the lift of the intake valve becomes equal to the set target lift. More specifically, the response characteristic until the lift of the intake valve converges to the target lift is determined according to the response characteristic value. Further, the averaging coefficient for use in the averaging calculation of the target intake air amount is also set using the same response characteristic value. That is, the degree of averaging of the target intake air amount by the averaging calculation is determined according to the response characteristic value. According to this preferred embodiment, since the common response characteristic value is used in the feedback control of the lift of the intake valve and the averaging calculation of the target intake air amount, it is possible to correct the target intake air amount by a proper degree of averaging according to the response characteristic of the lift of the intake valve, thereby making it possible to more effectively delay the change in the target intake air amount.

Preferably, the engine has a fixed-intake pressure operation mode in which the intake pressure is held at a fixed value by the throttle valve and the intake air amount is controlled by the lift of the intake valve, and the correction means corrects the target intake air amount in the fixed-intake pressure operation mode.

With the configuration of this preferred embodiment, the intake pressure is held at the fixed value by the throttle valve, and the intake air amount is controlled by the lift of the intake valve. Further, according to this preferred embodiment, the correction of the target intake air amount by the correction means is performed in the fixed-intake pressure operation mode. This makes it possible to accurately hold the intake pressure at the fixed value, whereby the above-described effects can be particularly effectively obtained.

To attain the above object, in a second aspect of the present invention, there is provided an intake control method for an internal combustion engine including a variable intake lift mechanism that adjusts an intake air amount by changing a lift of an intake valve, and a throttle valve that is disposed in an intake passage, for adjusting intake pressure by changing an opening of the throttle valve, comprising an operating condition-detecting step of detecting an operating condition of the engine, a target intake air amount-setting step of setting a target intake air amount serving as a target of the intake air amount according to the detected operating conditions of the engine, a correction step of correcting the set target intake air amount such that a change in the target intake air amount is delayed, and a throttle valve opening-setting step of setting the opening of the throttle valve according to the corrected target intake air amount.

With the configuration of the intake control method according to the second aspect of the present invention, it is possible to obtain the same advantageous effects as provided by the first aspect of the present invention.

Preferably, the intake control method further comprises a lift-detecting step of detecting a lift of the intake valve, and the correction step comprises a limit value-setting step of setting a limit value which is at least one of an upper limit value and a lower limit value of the target intake air amount according to the detected lift of the intake valve, and a limiting step of limiting the target intake air amount based on the set limit value.

More preferably, the engine includes a variable intake cam phase mechanism for changing a cam phase of an intake cam that actuates the intake valve, with respect to a crankshaft, and the intake control method further comprises a cam phase-detecting step of detecting the cam phase, the limit value-setting step including setting the limit value further according to the detected cam phase.

More preferably, the correction step further includes an averaging step of averaging the target intake air amount by averaging calculation.

Further preferably, the intake control method further comprises a target lift-setting step of setting a target lift that serves as a target of the lift of the intake valve, and a feedback step of feedback-controlling the lift of the intake valve using a response characteristic value representative of a predetermined response characteristic, such that the lift of the intake valve becomes equal to the set target lift, and the averaging step includes setting an averaging coefficient for the averaging calculation, using the response characteristic value.

Preferably, the engine has a fixed-intake pressure operation mode in which the intake pressure is held at a fixed value by the throttle valve and the intake air amount is controlled by the lift of the intake valve, and the correction step includes correcting the target intake air amount in the fixed-intake pressure operation mode.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 1 is a schematic view of an intake control system according to an embodiment of the present invention, and an internal combustion engine to which is applied the intake control system;

DETAILED DESCRIPTION OF PREFERRED EMBODIMENTS

Figure 2A:
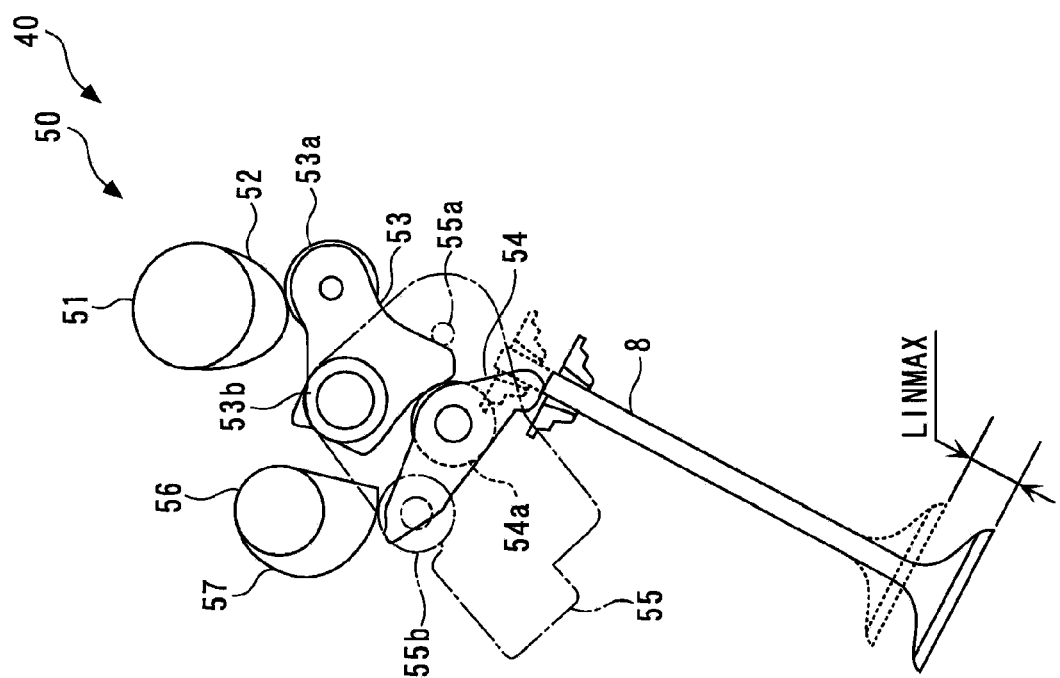
FIGS. 2A and 2B are schematic views of a variable intake lift mechanism.

The invention will now be described in detail with reference to the drawings showing a preferred embodiment thereof. FIG. 1 is a schematic view of an intake control system 1 for an internal combustion engine according to an embodiment of the present invention, and the internal combustion engine (hereinafter referred to as "the engine") 3 to which is applied the intake control system. As shown in FIG. 1, the intake control system 1 includes an ECU 2. As described hereinafter, the ECU 2 carries out various control processes, such as a fuel injection control process, for controlling the engine 3.

The engine 3 is a gasoline engine that has four cylinders (only one of which is shown), and is installed on a vehicle, not shown. A combustion chamber $3c$ is defined between a piston $3a$ and a cylinder head $3b$ for each cylinder of the engine 3. The piston $3a$ has a central portion of a top surface thereof formed with a recess $3d$. The cylinder head $3b$ has a fuel injection valve (hereinafter referred to as "the injector") 4 and a spark plug 5 mounted therethrough such that they face the combustion chamber $3c$. Fuel is directly injected from the injector 4 into the combustion chamber $3c$. In short, the engine 3 is of an in-cylinder injection type.

The injector 4 is inserted into the combustion chamber $3c$ through a central portion of the top wall thereof, and is connected to a high-pressure pump (not shown) via a fuel pipe (not shown). Fuel is supplied from a fuel tank, not shown, to the injector 4, after being pressurized by the high-pressure pump to high pressure and having the pressure thereof regulated by a regulator, not shown. The fuel is injected from the injector 4 toward the recess $3d$ of the piston $3a$, and hits the top surface of the piston $3a$ including the recess $3d$, to form fuel jets.

The spark plug 5 is connected to the ECU 2, and has a high voltage applied thereto in timing corresponding to ignition timing IG by the ECU 2, for causing a spark discharge to burn a mixture within the combustion chamber $3c$.

The cylinder head $3b$ of the engine 3 has an intake pipe 12 and an exhaust pipe 14 connected thereto, and includes a pair of intake valves 8 and 8 (only one of which is shown) and a pair of exhaust valves 9 and 9 (only one of which is shown), provided on a cylinder-by-cylinder basis. The intake valves 8 are opened and closed by an intake-side valve actuating mechanism 40, and the exhaust valves 9 are opened and closed by an exhaust-side valve actuating mechanism 70.

Figure 2B:
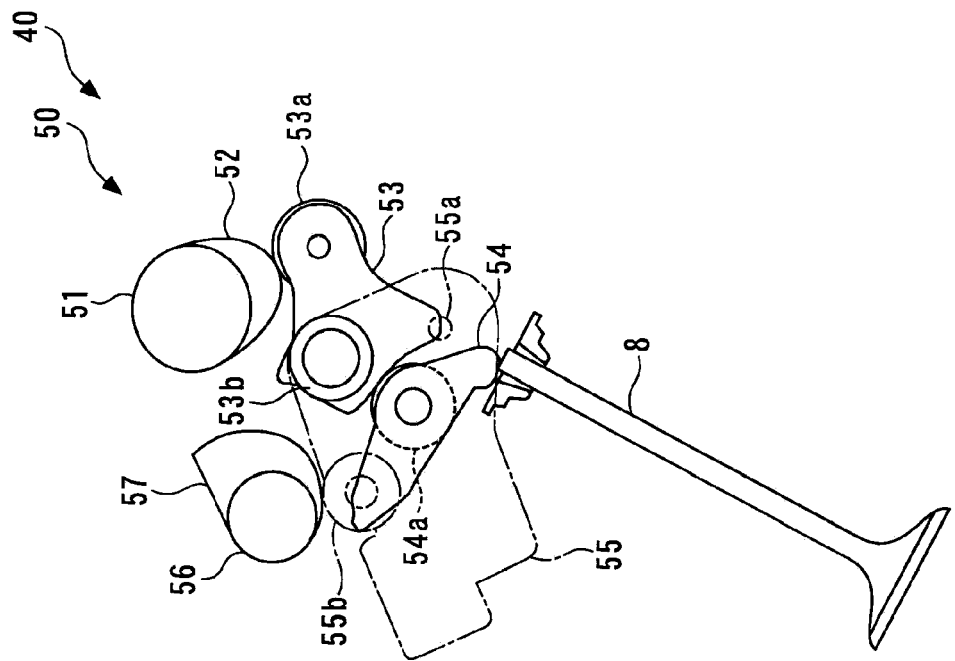

Referring to FIGS. 2A and 2B, the intake-side valve actuating mechanism 40 is comprised of an intake camshaft 51, intake cams 52, a variable intake lift mechanism 50, and so forth. In the present embodiment, the variable intake lift mechanism 50 continuously changes the lift of the intake valves 8. Further, it is assumed that the lift of the intake valve 8 (hereinafter referred to as "the intake lift LIFTIN") represents the maximum lift of the intake valve 8.

The intake camshaft 51 is connected to a crankshaft $3e$ (see FIG. 1) via an intake sprocket and a timing chain (neither of which is shown), whereby the intake camshaft 51 performs one rotation per two rotations of the crankshaft $3e$.

The variable intake lift mechanism 50 continuously changes the intake lift LIFTIN. As shown in FIGS. 2A and 2B, the variable intake lift mechanism 50 includes the intake camshaft 51 having the intake cams 52 integrally formed thereon, a control arm 55 supported on the cylinder head $3b$ via a shaft $55a$ about which the control arm 55 is pivotally movable, a control shaft 56 having a control cam 57 integrally formed thereon for pivotally moving the control arm 55, sub cams 53 supported by the control arm 55 via a support shaft $53b$ about which the sub cams 53 are pivotally movable, for being pivotally moved by the pivotal motions of the respective intake cams 52, and rocker arms 54 pivotally moved by the pivotal motions of the sub cams 53, for actuating the intake valves 8, respectively. The rocker arms 54 are pivotally supported by the control arm 55.

Each sub cam 53 has a roller $53a$ in contact with an associated one of the intake cams 52, and is pivotally moved about the support shaft $53b$ in accordance with the rotation of the intake camshaft 51. Each rocker arm 54 has a roller $54a$ in contact with an associated one of the sub cams 53 such that the motion of the sub cam 53 is transmitted to the rocker arm 54 via the roller $54a$.

The control arm 55 has a roller $55b$ in contact with the control cam 57, and is pivotally moved about the shaft $55a$ by being pressed by the control shaft 56 which turns, via the control cam 57 (and the roller $55b$). In the state shown in FIG. 2A, the respective motions of the sub cams 53 are hardly transmitted to the rocker arms 54, which maintains the associated intake valves 8 in a substantially fully closed state. On the other hand, in the state shown in FIG. 2B, the respective motions of the sub cams 53 are transmitted to the associated intake valve 8 via the rocker arm 54, whereby the intake lift LIFTIN takes its maximum lift LINMAX.

Figure 3:
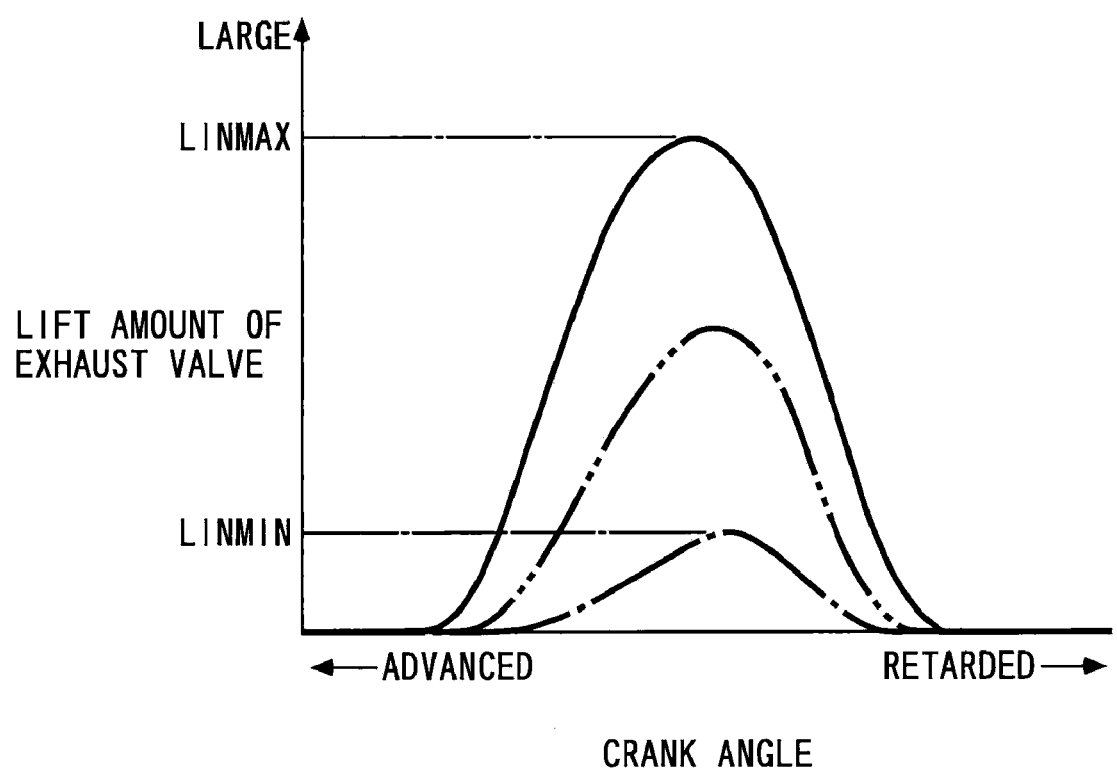
FIG. 3 is a view showing a valve lift curve of an intake valve, obtained when an intake lift is changed by the variable intake lift mechanism.

Therefore, by causing a motor 58 to turn the control shaft 56, the intake lift LIFTIN is continuously changed between the maximum lift LINMAX and its minimum lift LIFTIN-MIN shown in FIG. 3.

The variable intake lift mechanism 50 is provided with a CS angle sensor 21 for detecting a rotation angle CSA of the control shaft 56 (hereinafter referred to as "the CS angle CSA"), and delivers a signal indicative of the detected CS angle CSA to the ECU 2. The detected CS angle CSA is used as a parameter indicative of the intake lift LIFTIN.

A variable intake cam phase mechanism 60 is provided at one end of the intake camshaft 51. The variable intake cam phase mechanism 60 is operated by oil pressure supplied thereto, to continuously advance or retard a phase CAIN of the intake cam 52 with respect to the crankshaft $3e$ (hereinafter referred to as "the intake cam phase CAIN"), whereby the opening/closing timing of each pair of intake valves 8 is advanced or retarded. This increases or decreases a valve overlap between each pair of intake valves 8 and each pair of exhaust valves 9, to thereby increase or decrease an internal EGR rate, and change the charging efficiency.

Figure 4:
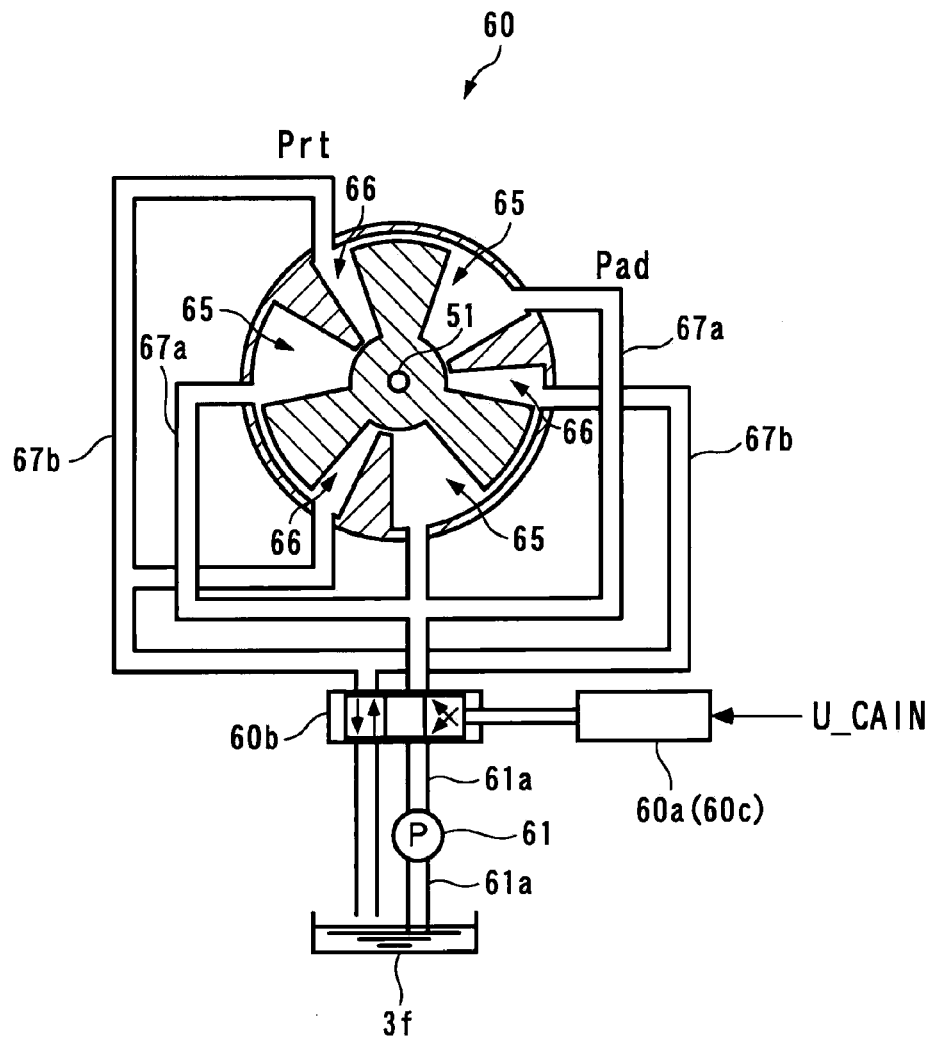
FIG. 4 is a schematic view of a variable intake cam phase mechanism.

Referring to FIG. 4, the variable intake cam phase mechanism 60 includes a solenoid valve 60a. The solenoid valve 60a is formed by a combination of a spool valve mechanism 60b and a solenoid 60c, and is connected to advance chambers 65 and retard chambers 66 via advance oil passages 67a and retard oil passages 67b, respectively. The solenoid valve 60a controls working fluid pressure supplied from an oil pressure pump 61 and supplies the same to the advance chambers 65 and the retard chambers 66 as advance oil pressure Pad and retard oil pressure Prt, respectively. The solenoid 60c moves a spool valve element of the spool valve mechanism 60b within a predetermined range of motion according to a phase control input U_CAIN input from the ECU 2 to thereby change the advance oil pressure Pad and the retard oil pressure Prt.

The oil pressure pump 61 is a mechanically-driven type which is connected to the crankshaft 3e. As the crankshaft 3e rotates, the oil pressure pump 61 draws working fluid stored in an oil pan 3f of the engine 3 via an oil passage 61a, for pressurization, and supplies the pressurized working fluid to the solenoid valve 60a via the oil passage 61a.

Figure 5:
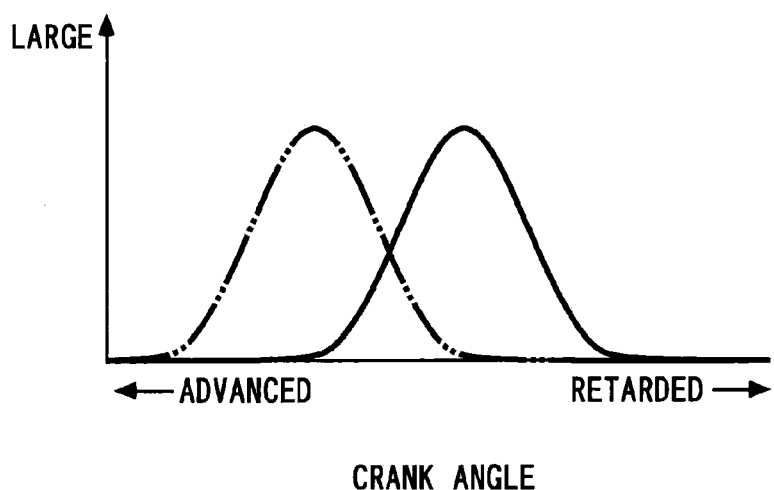
FIG. 5 is a diagram showing a valve lift curve of the intake valve (solid line) obtained when an intake cam phase is set to a most retarded value by the variable intake cam phase mechanism, and a valve lift curve of the intake valve (two-dot chain line) obtained when the intake cam phase is set to a most advanced value by the variable intake cam phase mechanism.

In the variable intake cam phase mechanism 60 configured as above, the solenoid valve 60a is operated according to the phase control input U_CAIN, to supply the advance oil pressure Pad to the advance chambers 65 and the retard oil pressure Prt to the retard chambers 66, respectively. As a result, the intake cam phase CAIN mentioned above is continuously changed between a predetermined most retarded value and a predetermined most advanced value, whereby the valve timing of the intake valves 8 is continuously changed between most retarded timing indicated by a solid line in FIG. 5 and most advanced timing indicated by a two-dot chain line in FIG. 5.

A cam angle sensor 24 is disposed at an end of the intake camshaft 51 opposite from the variable intake cam phase mechanism 60. The cam angle sensor 24 is implemented e.g. by a magnet rotor and an MRE pickup, for delivering a CAM signal, which is a pulse signal, to the ECU 2 along with rotation of the intake camshaft 51. Each pulse of the CAM signal is generated whenever the intake camshaft 51 rotates through a predetermined cam angle (e.g. 1°). The ECU 2 calculates an actual intake cam phase CAIN based on not only the CAM signal but also a CRK signal and a TDC signal, referred to hereinafter.

On the other hand, the exhaust-side valve actuating mechanism 70 is of the cam driven type, and is comprised of a rotatable exhaust camshaft 81, exhaust cams 82 integrally formed on the exhaust camshaft 81, a rocker arm shaft (not shown), and two rocker arms (not shown) pivotally supported by the rocker arm shaft and in contact with upper ends of the respective exhaust valves 9 and 9, and so forth.

The exhaust camshaft 81 is connected to the crankshaft 3e by an exhaust sprocket (not shown) and a timing chain (not shown), whereby the exhaust camshaft 81 performs one rotation per two rotations of the crankshaft 3e. When the exhaust camshaft 81 rotates, the rocker arms are pressed by the exhaust cams 82, and are pivotally moved about the rocker arm shaft to thereby open and close the exhaust valves 9 and 9.

Each exhaust cam 82 is comprised of a low-speed cam (not shown) and a high-speed cam (not shown) having a higher cam nose than that of the low-speed cam. The exhaust-side valve actuating mechanism 70 includes a valve timing switching mechanism (not shown) for switching the exhaust cam 82 between the low-speed cam and the high-speed cam. The valve timing switching mechanism executes the above-mentioned switching operation to thereby switch the valve timing of the exhaust valves 9 between low-speed valve timing (hereinafter referred to as "the LO.VT") and high-speed valve timing (hereinafter referred to as "the HI.VT"). During the HI.VT, the valve-opening time period of the exhaust valves 9 and the valve overlap between the intake valves 8 and the exhaust valves 9 become longer and the valve lift of the exhaust valve 9 also becomes larger than during the LO.VT, thereby enhancing the charging efficiency. The valve timing switching mechanism includes a solenoid valve (not shown). The solenoid valve is formed by combining a spool valve mechanism (not shown) and a solenoid (not shown), and controls the working fluid pressure supplied from the oil pressure pump 61 by a control input from the ECU 2 to execute the switching operation for switching the exhaust cam 82 between the low-speed cam and the high-speed cam. The ECU 2 controls the switching operation such that when the load on the engine 3 is low, the low-speed cam is used, whereas when the load is high, the high-speed cam is used.

The crankshaft 3e has a magnet rotor 22a mounted thereon. The magnet rotor 22a forms a crank angle sensor 22 together with an MRE pickup 22b. The crank angle sensor 22 delivers the CRK signal and the TDC signal, which are both pulse signals, to the ECU 2 in accordance with rotation of the crankshaft 3e.

The CRK signal is delivered whenever the crankshaft 3e rotates through a predetermined angle (e.g. 30°). The ECU 2 calculates the rotational speed NE of the engine 3 (hereinafter referred to as "the engine speed NE") based on the CRK signal. The TDC signal indicates that the piston 3a in an associated one of the cylinders is in a predetermined crank angle position in the vicinity of the top dead center (TDC) at the start of the suction stroke thereof, and in the case of the four-cylinder engine of the illustrated example, it is delivered whenever the crankshaft 3e rotates through 180 degrees.

The intake pipe 12 of the engine 3 is provided with a throttle valve 13a. A TH actuator 13b is connected to the throttle valve 13a. The opening ATH of the throttle valve 13a (hereinafter referred to as "the throttle valve opening ATH") is controlled by controlling the TH actuator 13b using a control input U_ATH from the ECU 2, whereby the intake air amount and the intake pressure of intake air drawn into the engine 3 are controlled. Further, the throttle valve opening ATH is detected by a throttle valve opening sensor 23 (see FIG. 1) and a signal indicative of the sensed throttle valve opening ATH is delivered to the ECU 2. Furthermore, an accelerator pedal opening sensor 25 detects the amount AP of operation (stepped-on amount) of an accelerator pedal, not shown, (hereinafter referred to as "the accelerator pedal opening" AP), and delivers a signal indicative of the sensed accelerator pedal opening AP to the ECU 2.

Further, the intake pipe 12 has an intake air amount sensor 26 inserted therein at a location upstream of the throttle valve 13a. Further, the intake pipe 12 has an intake pressure sensor 27 and an intake air temperature sensor 28 inserted therein at respective locations downstream of the throttle valve 13a. The intake air amount sensor 26 detects an intake air amount GAIR and delivers a signal indicative of the sensed intake air amount GAIR to the ECU 2. The intake air temperature sensor 28 detects the temperature TA of intake air (hereinafter referred to as "the intake air temperature TA") on the downstream side of the throttle valve 13a, and delivers a signal indicative of the sensed intake air temperature TA to the ECU 2.

The intake pressure sensor 27 detects pressure PB of intake air (hereinafter referred to as "the intake pressure PB") on the downstream side of the throttle valve 13a as absolute pressure, and delivers a signal indicative of the sensed intake pressure PB to the ECU 2. The ECU 2 calculates the difference between the intake pressure PB and atmospheric pressure PA detected by an atmospheric pressure sensor 29 (=PB−PA) as intake negative pressure PBGA.

Further, the ECU 2 is implemented by a microcomputer (not shown) comprised of a CPU 2a, a RAM 2b, a ROM 2c, and an I/O interface (none of which are shown). The detection signals from the aforementioned sensors 21 to 29 are input to the ECU 2, and then are input to the CPU 2a after the I/O interface performs A/D conversion and waveform shaping thereon. In response to these detection signals, the CPU 2a performs various computing operations according to the control programs stored in the ROM 2c.

For example, the ECU 2 sets a target intake cam phase CAINCMD, which serves as a target of the intake cam phase CAIN of the variable intake cam phase mechanism 60, according to the engine speed NE and a demanded torque PMCMD, and carries out feedback control of the detected intake cam phase CAIN such that the intake cam phase CAIN converges to the target intake cam phase CAINCMD. The above-mentioned demanded torque PMCMD is calculated according to the engine speed NE and the accelerator pedal opening AP.

Further, the ECU 2 calculates a target intake negative pressure PBGACMD according to operating conditions of the engine 3 (e.g. a target intake air amount GAIRCMD). Then, when the target intake negative pressure PBGACMD has reached a predetermined value (e.g. a weak negative pressure of approximately −100 mmHg) and at the same time the engine speed NE and the demanded torque PMCMD are not larger than respective threshold values, the ECU 2 performs a fixed-intake pressure operation in which the intake negative pressure PBGA is maintained at a predetermined value using the throttle valve 13a and the intake air amount GAIR is controlled using the intake lift LIFTIN. When the target intake negative pressure PBGACMD is smaller than the above-mentioned predetermined value, the ECU 2 performs a throttling operation in which the intake lift LIFTIN is fixed at a predetermined lift and the intake negative pressure PBGA is controlled using the throttle valve 13a such that the intake negative pressure PBGA becomes equal to the target intake negative pressure PBGACMD.

In the present embodiment, the ECU 2 corresponds to target intake air amount-setting means, correction means, throttle valve opening-setting means, limit value-setting means, limiting means, averaging means, target lift-setting means, and feedback means.

Next, a process for correcting the target intake air amount GAIRCMD, performed by the ECU 2, will be described with reference to FIG. 6. This process is executed whenever a predetermined time period elapses.

In the present process, first, in a step 1 (denoted as S1 in abbreviated form in FIG. 6, and all other steps in figures are also denoted in abbreviated form), the target intake air amount GAIRCMD is calculated by searching a predetermined target intake air amount map (not shown) according to the engine speed NE and the demanded torque PMCMD. In this target intake air amount map, the target intake air amount GAIRCMD is set to a larger value as the demanded torque PMCMD of the engine 3 is larger.

Next, in a step 2, it is determined whether or not an operation mode flag F_AVTHAR is equal to 0. This operation mode flag F_AVTHAR is set to 0 when the above-mentioned fixed-intake pressure operation is being performed.

If the answer to this question is negative (NO), i.e. if the fixed-intake pressure operation is not being performed, the target intake air amount GAIRCMD is directly set as a corrected target intake air amount GAIRCCOR (step 3), followed by terminating the present process.

On the other hand, if the answer to the question of the step 2 is affirmative (YES), i.e. if the fixed-intake pressure operation is being performed, it is determined whether or not the current value GAIRCMD(n) of the calculated target intake air amount is larger than the immediately preceding value GAIRCMD(n−1) thereof (step 4). If the answer to this question is affirmative (YES), i.e. if the target intake air amount GAIRCMD has increased, an upper limit value GAIRLMTH of the target intake air amount GAIRCMD is calculated (step 5). A process for calculating the upper limit value GAIRLMTH will be described hereinafter.

Next, it is determined whether or not the target intake air amount GAIRCMD is larger than the upper limit value GAIRLMTH (step 6). If the answer to this question is negative (NO), i.e. if GAIRCMD≦GAIRLMTH holds, it is determined that the target intake air amount GAIRCMD is not too large, and the process directly proceeds to a step 11 without limiting the target intake air amount GAIRCMD.

On the other hand, if the answer to the question of the step 6 is affirmative (YES), i.e. if GAIRCMD>GAIRLMTH holds, it is determined that the target intake air amount GAIRCMD is too large, and to limit the target intake air amount GAIRCMD, the target intake air amount GAIRCMD is set to the upper limit value GAIRLMTH (step 7), and then the process proceeds to the step 11.

If the answer to the question of the step 4 is negative (NO), i.e. if the target intake air amount GAIRCMD has not changed or has decreased, a lower limit value GAIRLMTL of the target intake air amount GAIRCMD is calculated (step 8). A process for calculating the lower limit value GAIRLMTL will be described hereinafter.

Next, it is determined whether or not the target intake air amount GAIRCMD is smaller than the lower limit value GAIRLMTL (step 9). If the answer to this question is negative (NO), i.e. if GAIRCMD≧GAIRLMTL holds, it is determined that the target intake air amount GAIRCMD is not too small, and the process directly proceeds to the step 11 without limiting the target intake air amount GAIRCMD.

On the other hand, if the answer to the question of the step 9 is affirmative (YES), i.e. if GAIRCMD<GAIRLMTL holds, it is determined that the target intake air amount GAIRCMD is too small, and to limit the target intake air amount GAIRCMD, the target intake air amount GAIRCMD is set to the lower limit value GAIRLMTL (step 10), followed by the process proceeding to the step 11.

In the step 11, the corrected target intake air amount GAIRCCOR is calculated by the following equation (1) using the target intake air amount GAIRCMD set in the step 1 or limited in the step 7 or 10, followed by terminating the present process.

$$GAIRCCOR = Knam \cdot GAIRCMD(n) + (1-Knam) \cdot GAIRCMD(n-1) \qquad (1)$$

As is clear from the equation (1), the corrected target intake air amount GAIRCCOR is calculated as a weighted average value of the current value GAIRCMD(n) of the target intake air amount and the immediately preceding value GAIRCMD(n−1) thereof, and an averaging coefficient Knam is used as a weighting factor for calculating a weighted average. Therefore, the corrected target intake air amount GAIRCCOR is calculated such that it becomes closer to the immediately preceding value GAIRCMD(n−1) of the target intake air amount as the averaging coefficient Knam is smaller, which increases the degree of averaging of the target intake air amount GAIRCMD. On the other hand, the corrected target intake air amount GAIRCCOR is calculated such that it becomes closer to the current value GAIRCMD(n) of the target intake air amount as the averaging coefficient Knam is larger, which reduces the degree of averaging of the target intake air amount GAIRCMD.

The averaging coefficient Knam is calculated using a control period Stime and an ELC response time constant τp by the following equation (2):

$$Knam = \frac{Stime}{\tau p + Stime} \quad (2)$$

In this equation, the control period Stime is obtained by converting a time interval at which each TDC signal pulse is generated, which is a repetition period at which the present process is executed, to a time period (sec), and is calculated by the following equation (3) using the engine speed NE (rpm):

$$Stime = \frac{1}{NE/60} \cdot \frac{CRANK\ ANGLE\ BETWEEN\ TDC\ SIGNAL\ PULSES}{360} \quad (3)$$

In the case of the four-cylinder engine of the illustrated example, the TDC signal is delivered whenever the crankshaft 3e rotates through 180 degrees, and accordingly the equation (3) can be changed into Stime=30/NE.

Further, the ELC response time constant τp is used for determining the response characteristic when the intake lift LIFTIN is feedback-controlled to a target lift LIFTINCMD, as will be described hereinafter.

Further, as is clear from the equation (2), the ELC response time constant τp and the control period Stime are both positive values, and hence 0<Knam<1 holds, and the averaging coefficient Knam becomes smaller as the ELC response time constant zp is larger.

Figure 6:
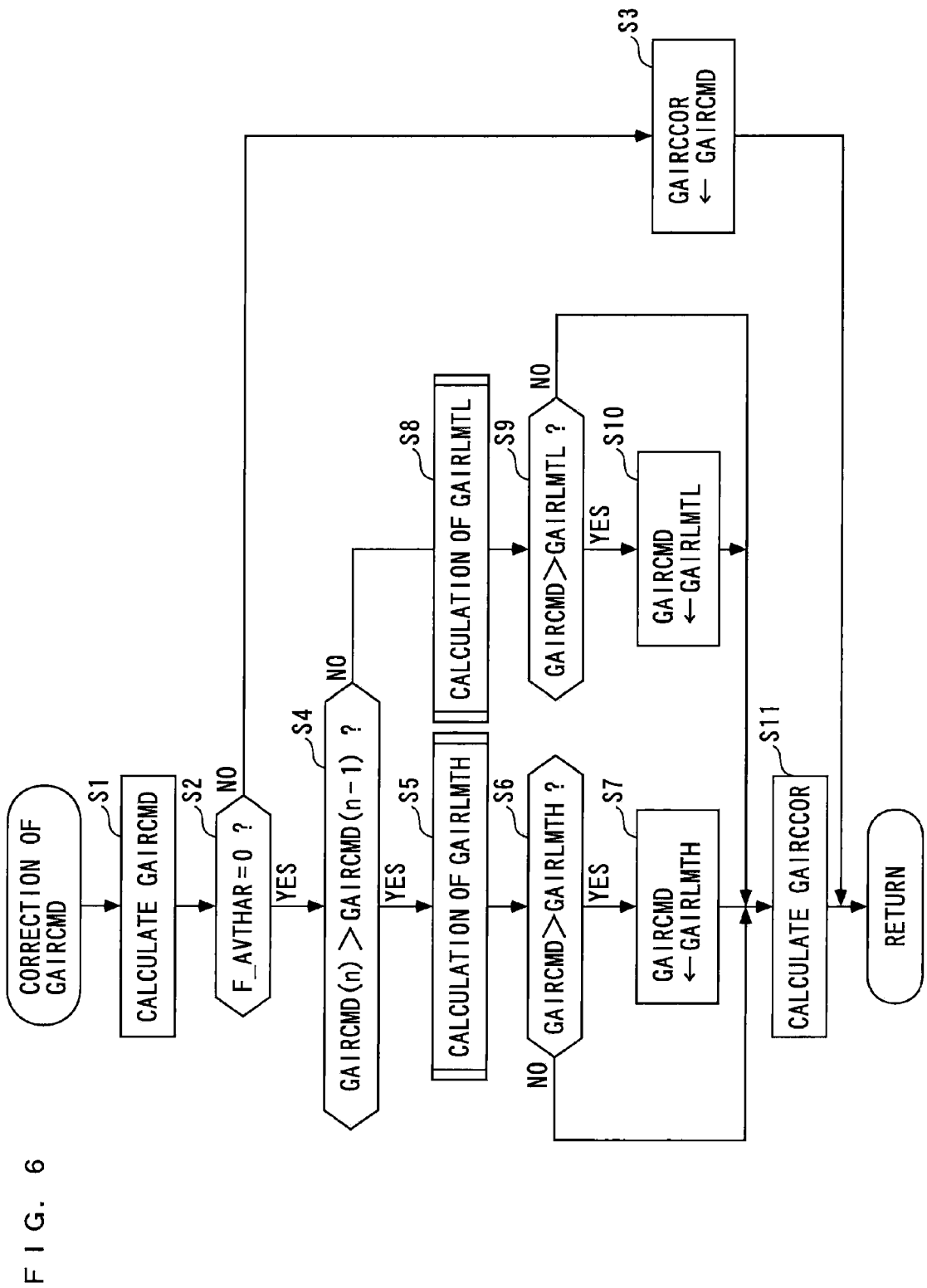
FIG. 6 is a flowchart of a process for correcting a target intake air amount.
Figure 7:
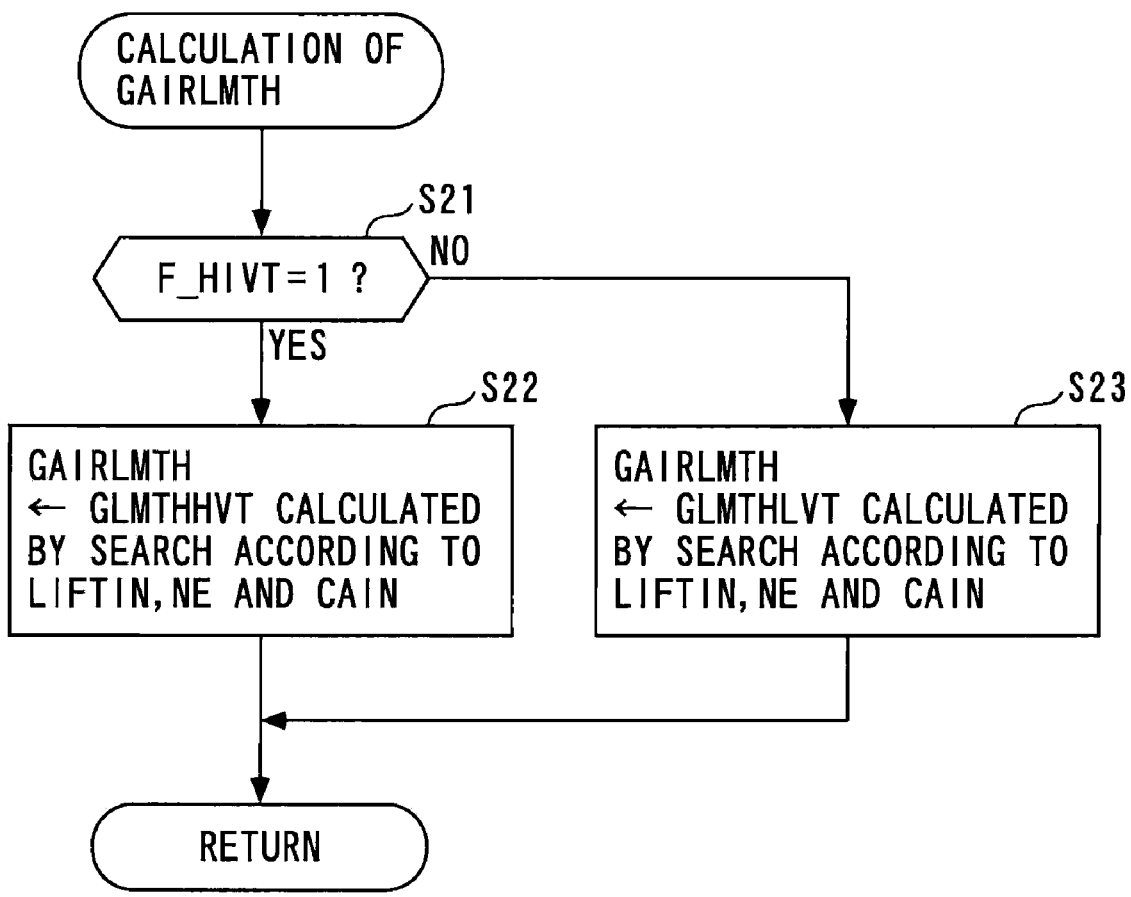
FIG. 7 is a flowchart of a process for calculating an upper limit value of the target intake air amount.

FIG. 7 shows the process for calculating the upper limit value GAIRLMTH of the target intake air amount GAIRCMD, which is executed in the step 5 in FIG. 6. In this process, first, in a step 21, it is determined whether or not a valve timing flag F_HIVT is equal to 1. This valve timing flag F_HIVT is set to 1 when the valve timing of the exhaust valve 9 is set to the HI.VT by the valve timing switching mechanism described hereinabove.

If the answer to the question of the step 21 is affirmative (YES), i.e. if the valve timing of the exhaust valve 9 is set to the HI.VT, an upper limit value GLMTHHVT for the HI.VT is calculated by searching a predetermined HI.VT upper limit value map (not shown) according to the intake lift LIFTIN, the engine speed NE, and the intake cam phase CAIN, and is set as the upper limit value GAIRLMTH (step 22), followed by terminating the present process. In this upper limit value map, the upper limit value GLMTHHVT for the HI.VT is set to a smaller value as the intake lift LIFTIN is larger, the engine speed NE is higher, and the charging efficiency determined according to the intake cam phase CAIN is smaller, whereby the target intake air amount GAIRCMD is more strictly limited by the upper limit value GAIRLMTH.

On the other hand, if the answer to the question of the step 21 is negative (NO), i.e. if the valve timing of the exhaust valve 9 is set to the LO.VT, an upper limit value GLMTHLVT for the LO.VT is calculated by searching a predetermined LO.VT upper limit value map (not shown) according to the intake lift LIFTIN, the engine speed NE, and the intake cam phase CAIN, and is set as the upper limit value GAIRLMTH (step 23), followed by terminating the present process. In this upper limit value map, similarly to the HI.VT upper limit value map, the upper limit value GLMTHLVT for the LO.VT is set to a smaller value as the intake lift LIFTIN is larger, the engine speed NE is higher, and the charging efficiency determined according to the intake cam phase CAIN is smaller, whereby the target intake air amount GAIRCMD is more strictly limited by the upper limit value GAIRLMTH.

Figure 8:
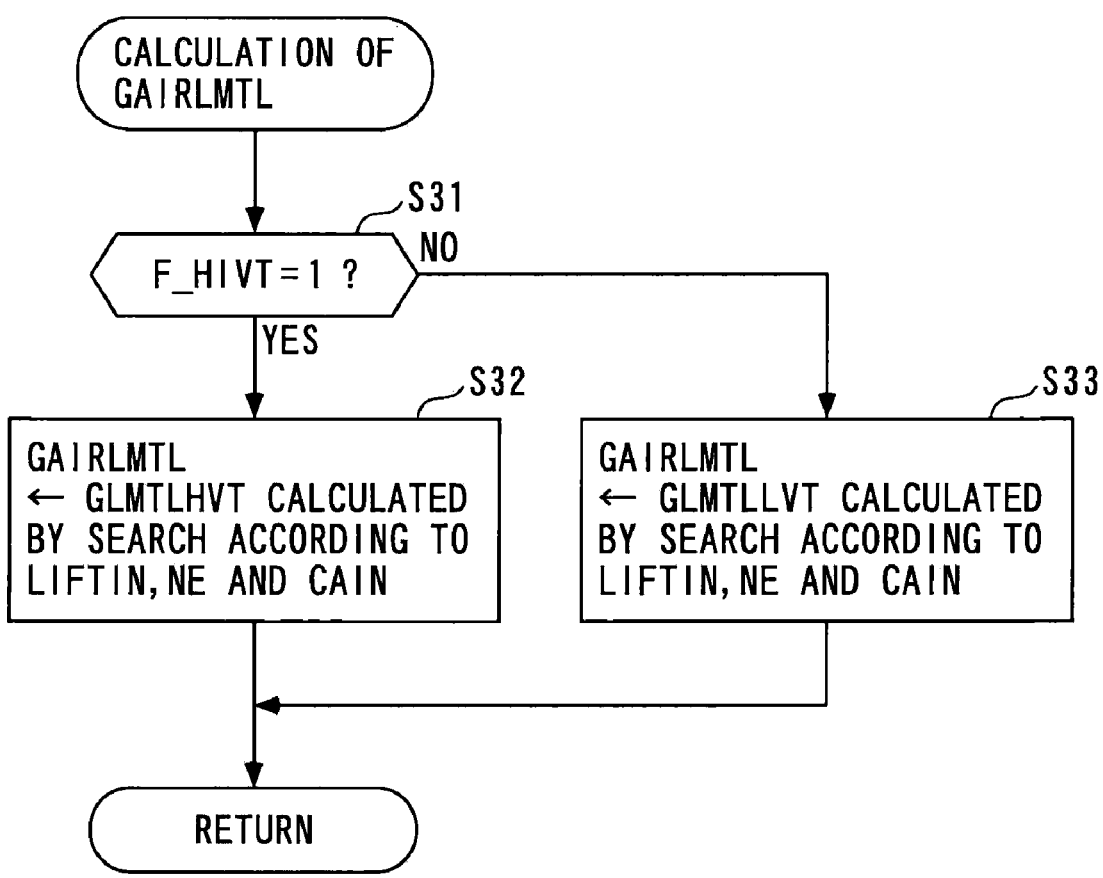
FIG. 8 is a flowchart of a process for calculating a lower limit value of the target intake air amount.

FIG. 8 shows the process for calculating the lower limit value GAIRLMTL of the target intake air amount GAIRCMD, which is executed in the step 8 in FIG. 6. In this process, first, in a step 31, it is determined whether or not the valve timing flag F_HIVT is equal to 1.

If the answer to the question of the step 31 is affirmative (YES), i.e. if the valve timing of the exhaust valve 9 is set to the HI.VT, a lower limit value GLMTLHVT for the HI.VT is calculated by searching a predetermined HI.VT lower limit value map (not shown) according to the intake lift LIFTIN, the engine speed NE, and the intake cam phase CAIN, and is set as the lower limit value GAIRLMTL (step 32), followed by terminating the present process. In this lower limit value map, the lower limit value GLMTLHVT for the HI.VT is set to a larger value as the intake lift LIFTIN is larger, the engine speed NE is higher, and the charging efficiency determined according to the intake cam phase CAIN is smaller, whereby the target intake air amount GAIRCMD is more strictly limited by the lower limit value GAIRLMTL.

On the other hand, if the answer to the question of the step 31 is negative (NO), i.e. if the valve timing of the exhaust valve 9 is set to the LO.VT, a lower limit value GLMTLLVT for the LO.VT is calculated by searching a predetermined LO.VT lower limit value map (not shown) according to the intake lift LIFTIN, the engine speed NE, and the intake cam phase CAIN, and is set as the lower limit value GAIRLMTL (step 33), followed by terminating the present process. In this lower limit value map, similarly to the HI.VT lower limit value map, the lower limit value GLMTLLVT for the LO.VT is set to a larger value as the intake lift LIFTIN is larger, the engine speed NE is higher, and the charging efficiency determined according to the intake cam phase CAIN is smaller, whereby the target intake air amount GAIRCMD is more strictly limited by the lower limit value GAIRLMTL.

Figure 9:
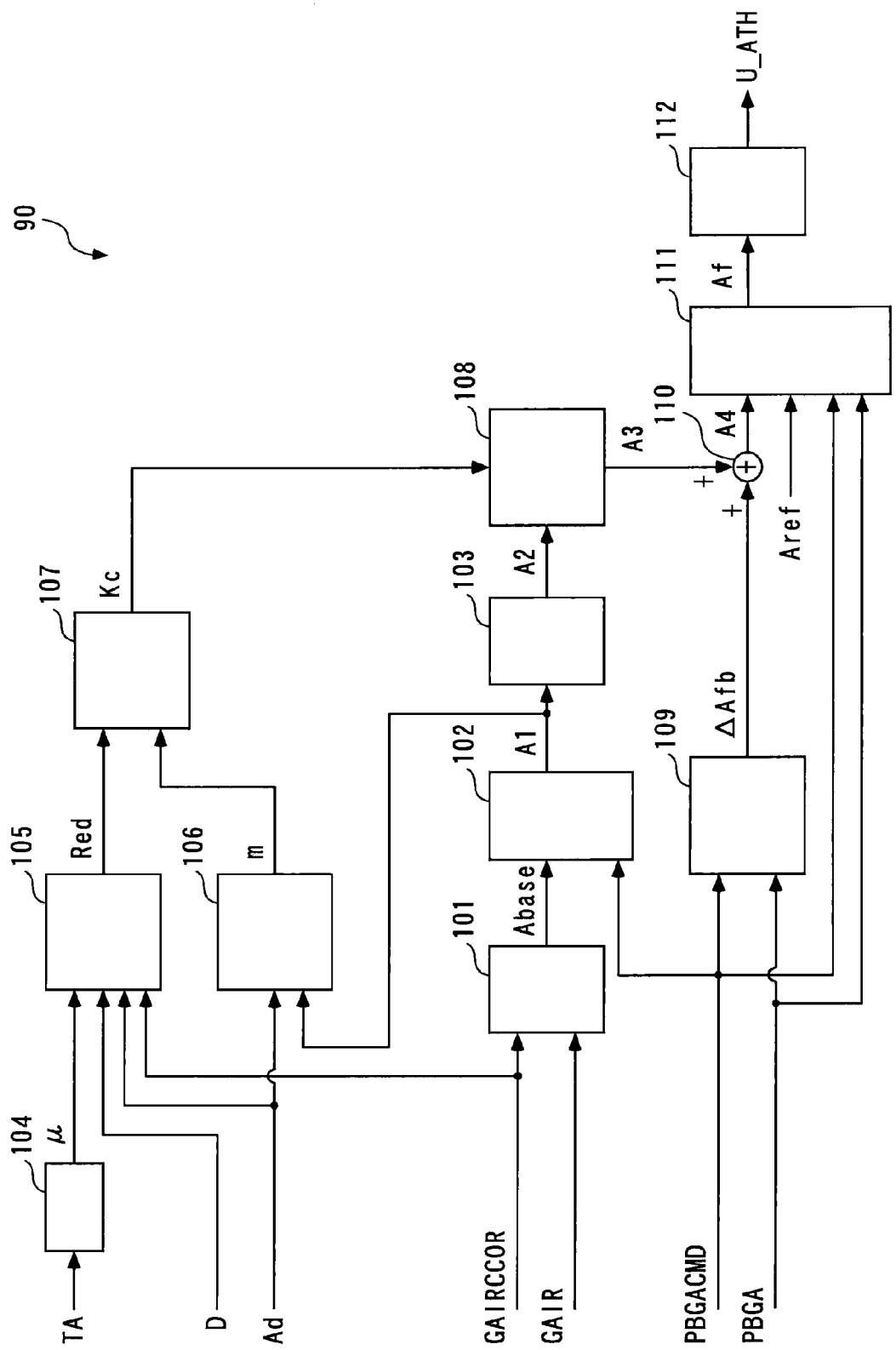
FIG. 9 is a block diagram of a throttle valve opening-setting section.

FIG. 9 is a block diagram of a throttle valve opening-setting section 90 for setting the throttle valve opening ATH during the fixed-intake pressure operation.

First, a base throttle opening area-calculating section 101 calculates a base throttle opening area Abase by searching a predetermined map (not shown) according to the corrected target intake air amount GAIRCCOR. The base throttle opening area Abase corresponds to an area of the opening of the throttle valve 13a, at which the corrected target intake air amount GAIRCCOR can be obtained, when the intake negative pressure PBGA, the atmospheric pressure PA, and the intake air temperature TA are in predetermined base conditions. For this reason, in this map, the base throttle opening area Abase is set to a larger value as the corrected target intake air amount GAIRCCOR is larger. In the predetermined base conditions, the intake negative pressure PBGA=PBGAbase, the intake air temperature TA=TAbase, and the atmospheric pressure PA=PAbase hold.

A first correction section 102 calculates a first throttle opening area A1 corresponding to the target intake negative pressure PBGACMD by correcting the calculated base throttle opening area Abase according to the target intake negative pressure PBGACMD, using the following equation (4):

$$A1 = Abase \cdot \sqrt{\frac{PBGAbase}{|PBGACMD|}} \qquad (4)$$

A second correction section 103 calculates a second throttle opening area A2 in which is reflected the density of intake air which changes according to the intake air temperature TA and the atmospheric pressure PA, by correcting the calculated first throttle opening area A1 according to the intake air temperature TA and the atmospheric pressure PA, using the following equation (5):

$$A2 = A1 \cdot \sqrt{\frac{273 + TA}{273 + TAbase} \cdot \frac{PAbase}{PA}} \qquad (5)$$

A viscosity coefficient-calculating section 104 calculates the viscosity coefficient $\mu$ of intake air using a predetermined map (not shown) according to the intake air temperature TA.

A Reynolds number-calculating section 105 calculates a Reynolds number Red using the calculated viscosity coefficient $\mu$ of intake air, the corrected target intake air amount GAIRCCOR, a passage opening area Ad of the intake pipe 12, and an inner diameter D of the intake pipe 12, by the following equation (6):

$$Red = \frac{GAIRCCOR \cdot D}{\mu \cdot Ad} \qquad (6)$$

The Reynolds number serves as the indices of the viscosity and inertia of intake air. As the Reynolds number Red is smaller, it indicates that the action of the viscosity on intake air is larger, and as the Reynolds number Red is larger, it indicates that the action of the inertia on intake air is larger.

An opening area ratio-calculating section 106 calculates an opening area ratio m indicative of a ratio of the first throttle opening area A1 to the passage opening area Ad of the intake pipe 12, based on the passage opening area Ad and the first throttle opening area A1, using the following equation (7):

$$m = A1/Ad \qquad (7)$$

A correction coefficient-calculating section 107 calculates a correction coefficient Kc by searching a predetermined map (not shown) according to the calculated opening area ratio m and the Reynolds number Red. In this map, the correction coefficient Kc is set to a smaller value as the opening area ratio m is smaller and the Reynolds number Red is larger since in such cases intake air flows more easily.

A third correction section 108 calculates a third throttle opening area A3 (=Kc·A2) by multiplying the second throttle opening area A2 calculated by the second correction section 103 by the calculated correction coefficient Kc.

A feedback correction section 109 calculates a correction value $\Delta Afb$ by feedback-controlling the intake negative pressure PBGA and the target intake negative pressure PBGACMD such that the former converges to the latter.

An adding section 110 calculates a fourth throttle opening area A4 by adding the third throttle opening area A3 calculated by the third correction section 108 and the above-described correction value $\Delta Afb$.

A switching section 111 calculates the difference between the target intake negative pressure PBGACMD and the intake negative pressure PBGA, and sets a final opening area Af according to the difference. Specifically, when the difference is smaller than a predetermined reference value, it is determined that the feedback control has achieved excellent conversion of the intake negative pressure PBGA to the target intake negative pressure PBGACMD, so that the fourth throttle opening area A4 is set as the final opening area Af.

On the other hand, when the difference is larger than the predetermined reference value, it is determined that the feedback control has not achieved excellent conversion of the intake negative pressure PBGA to the target intake negative pressure PBGACMD, so that the feedback control is stopped and the final opening area Af is set to a predetermined fully-closed value Aref that corresponds to a fully-closed state of the throttle valve opening ATH.

A throttle valve opening-calculating section 112 calculates the throttle valve opening control input U_ATH by searching a predetermined map (not shown) according to the final opening area Af. Then, the calculated throttle valve opening control input U_ATH is transmitted to the TH actuator 13b, whereby the throttle valve opening ATH is caused to become equal to a value corresponding to the final opening area Af, and the intake negative pressure PBGA is caused to converge to the target intake negative pressure PBGACMD.

Figure 10:
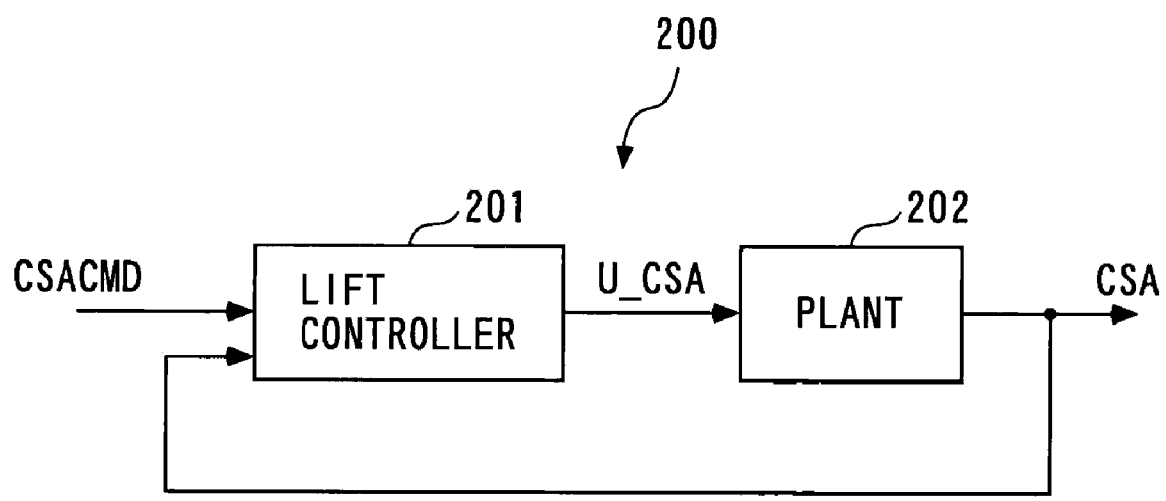
FIG. 10 is a block diagram of an intake lift control section.

FIG. 10 is a block diagram of an intake lift control section 200 for feedback-controlling the intake lift LIFTIN. The intake lift control section 200 includes a lift controller 201 and a plant 202. The lift controller 201 is implemented by the ECU 2, and the plant 202 is comprised of the variable intake lift mechanism 50, the motor 58, and so forth. The lift controller 201 sets a target CS angle CSACMD, which is a CS angle CSA of the control shaft 56, corresponding to the target lift LIFTINCMD, and calculates a CS control input U_CSA by feedback control such that a detected CS angle CSA converges to the target CS angle CSACMD. The motor 58 of the variable intake lift mechanism 50 is driven by the calculated CS control input U_CSA to cause the CS angle CSA to converge to the target CS angle CSACMD, whereby the intake lift LIFTIN is controlled such that it converges to the target lift LIFTINCMD.

Further, in the plant 202 as a system to which is input the CS control input U_CSA and from which is output the CS angle CSA of the control shaft 56 in response to the input of the CS control input U_CSA, the equation of motion of the plant 202 can be expressed by a transfer function of the following equation (8) using a Laplace operator s.

$$\frac{CSA(s)}{U\_CSA(s)} = \frac{1}{Jall \cdot s^2 + Ball \cdot s} \qquad (8)$$

In this equation, Jall and Ball represent the inertia and the viscosity resistance of the whole system from the motor 58 to the control shaft 56, respectively.

Figure 11:
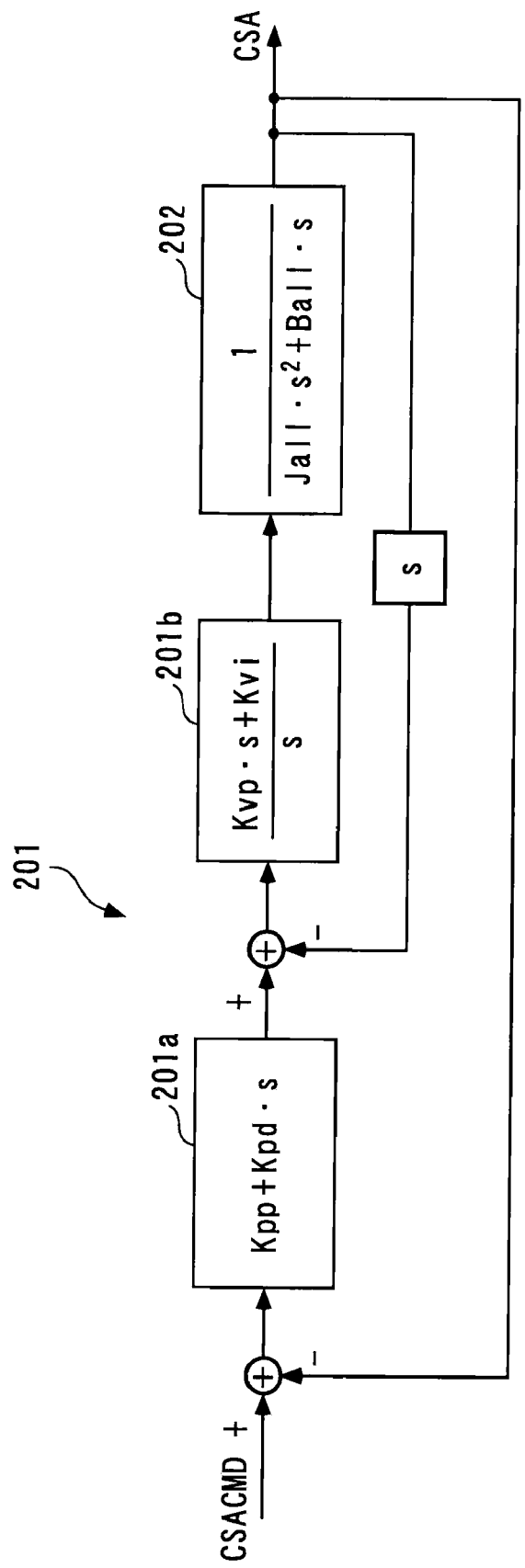
FIG. 11 is a block diagram of a lift controller and a plant expressed in a transfer function.

FIG. 11 is a block diagram of the lift controller 201 and the plant 202 expressed by a transfer function using Laplace transform. A P-term gain Kpp and a D-term gain Kpd used for position control by the feedback control and a P-term gain Kvp and an I-term gain Kvi used for speed control by the feedback control are expressed by the following equations (9) to (12):

$$Kpp = 1/\tau p \quad (9)$$

$$Kpd = \tau\omega/\tau p \quad (10)$$

$$Kvp = Jall/\tau\omega \quad (11)$$

$$Kvi = Ball/\tau\omega \quad (12)$$

Here, $\tau p$ represents the ELC response time constant used in the position control, and $\tau\omega$ represents a time constant used in the speed control.

Further, a block diagram shown in FIG. 11 is represented by a synthetic transfer function expressed by the following equation (13):

$$CSA(s) = \frac{1}{\tau p \cdot s + 1} \cdot CSACMD(s) \quad (13)$$

As is clear from the equation (13), the synthetic transfer function represents a first-order lag system of the ELC response time constant $\tau p$. Further, the synthetic transfer function does not include the time constant $\tau\omega$ used in the speed control but includes only the ELC response time constant $\tau p$ as a time constant used in the position control. Therefore, when the ELC response time constant $\tau p$ is fixed, a time period taken before the CS angle CSA becomes equal to approximately 63% of the target CS angle CSACMD is fixed, which fixes a time period taken before the intake lift LIFTIN becomes equal to approximately 63% of the target lift LIFTINCMD.

As described hereinabove, according to the present embodiment, the target intake air amount GAIRCMD set according to operating conditions of the engine 3 is corrected such that the change in the target intake air amount GAIRCMD is delayed, and the throttle valve opening ATH is set according to the target intake air amount GAIRCMD subjected to the correction (the corrected target intake air amount GAIRCCOR). This makes it possible to suppress a change in the intake negative pressure PBGA caused by the delay of the actual intake air amount GAIR from the target intake air amount GAIRCMD when the target intake air amount GAIRCMD is changed. Therefore, even in a transient operating condition of the engine in which the target intake air amount GAIRCMD is varied, it is possible to suppress a change in the intake negative pressure PBGA caused by a change in the target intake air amount GAIRCMD, whereby it is possible to control the intake negative pressure PBGA stably and accurately.

Further, since the target intake air amount GAIRCMD is corrected by being limited by a limit value, the target intake air amount GAIRCMD is prevented from being set to a too large or a too small value so as to avoid a large change in the target intake air amount GAIRCMD, whereby it is possible to effectively delay a change in the target intake air amount GAIRCMD. Further, since the limit value is set according to the detected intake lift LIFTIN, it is possible to properly limit and correct the target intake air amount GAIRCMD according to a change in the delay of the actual intake air amount GAIR from the target intake air amount GAIRCMD, caused by the intake lift LIFTIN.

Further, since the limit value is set according not only to the intake lift LIFTIN but also to the intake cam phase CAIN, it is possible to more properly limit and correct the target intake air amount GAIRCMD.

Furthermore, since the target intake air amount GAIRCMD is corrected by being averaged by the averaging calculation using the equation (1), it is possible to avoid a sudden change in the target intake air amount GAIRCMD, thereby making it possible to effectively delay the change in the target intake air amount GAIRCMD.

Further, since the common ELC response time constant $\tau p$ is used in the feedback control of the intake lift LIFTIN and the averaging calculation of the target intake air amount GAIRCMD, it is possible to correct the target intake air amount GAIRCMD by a proper degree of averaging according to the response characteristic of the intake lift LIFTIN, which makes it possible to more effectively delay the change in the target intake air amount GAIRCMD.

Further, the correction of the target intake air amount GAIRCMD is performed in the fixed-intake pressure operation mode in which the intake negative pressure PBGA is held at a fixed value by the throttle valve 13a and the intake air amount GAIR is controlled by the intake lift LIFTIN. This makes it possible to accurately hold the intake negative pressure PBGA at a holding pressure PBHOLD, whereby it is possible to particularly effectively obtain the aforementioned effects.

It is to be understood that the present invention is not limited to the embodiment described above, but it can be practiced in various forms. For example, in the above-described embodiment, as parameters for setting the upper limit value GAIRLMTH and the lower limit value GAIRLMTL, not only the intake lift LIFTIN and the intake cam phase CAIN but also an increase/decrease state of the target intake air amount GAIRCMD and the valve timing of the exhaust-side valve actuating mechanism 70 are used, but any other suitable parameters may be employed in place thereof or in addition thereto. Further, although in the above-described embodiment, both of the upper limit value GAIRLMTH and the lower limit value GAIRLMTL are set as the limit values of the target intake air amount, only one of them may be set for limiting the target intake air amount.

Further, although in the above-described embodiment, the'target intake air amount is corrected during the fixed-intake pressure operation, the target intake air amount may be corrected in any other suitable operation mode. Further, the method of setting the throttle valve opening ATH during the fixed-intake pressure operation, which is described hereinabove with reference to FIG. 9, is only an example, but it is also possible to employ any other suitable method for setting the throttle valve opening ATH according to the corrected target intake air amount GAIRCCOR.

Further, although in the above-described embodiment, the variable intake lift mechanism 50 is of an electrically-driven type using the motor 58, the variable intake lift mechanism 50 may be replaced by a hydraulic-type which is operated by pressure of working fluid.

Furthermore, although in the above-described embodiment, the present invention is applied to a gasoline engine installed on a vehicle, by way of example, this is not limitative, but the present invention may be applied to various types of engines, such as a diesel engine, other than the gasoline engine. Further, the present invention can also be applied to engines other than engines for vehicles, including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An intake control system for an internal combustion engine, comprising:
    a variable intake lift mechanism that adjusts an intake air amount by changing a lift of an intake valve;
    a throttle valve that is disposed in an intake passage, for adjusting intake pressure by changing an opening of said throttle valve;
    operating condition-detecting means for detecting operating conditions of the engine;
    target intake air amount-setting means for setting a target intake air amount serving as a target of the intake air amount according to the detected operating conditions of the engine;
    correction means for correcting the set target intake air amount such that a change in the target intake air amount is delayed;
    throttle valve opening-setting means for setting the opening of said throttle valve according to the corrected target intake air amount; and
    lift-detecting means for detecting a lift of the intake valve, wherein said correction means comprises:
    limit value-setting means for setting a limit value which is at least one of an upper limit value and a lower limit value of the target intake air amount according to the detected lift of the intake valve, and
    limiting means for limiting the target intake air amount based on the set limit value,
    and when the target intake air amount is limited by said limiting means, corrects the limited target intake air amount such that a change in the limited target intake air amount is delayed.

2. The intake control system as claimed in claim 1, wherein the engine has a fixed-intake pressure operation mode in which the intake pressure is held at a fixed value by the throttle valve and the intake air amount is controlled by the lift of the intake valve, and wherein said correction means corrects the target intake air amount in the fixed-intake pressure operation mode.

3. The intake control system as claimed in claim 1, wherein said correction means further includes averaging means for averaging the target intake air amount by averaging calculation.

4. The intake control system as claimed in claim 3, further comprising:
    target lift-setting means for setting a target lift that serves as a target of the lift of the intake valve, and feedback means for feedback-controlling the lift of the intake valve using a response characteristic value representative of a predetermined response characteristic, such that the lift of the intake valve becomes equal to the set target lift, and wherein said averaging means sets an averaging coefficient for the averaging calculation, using the response characteristic value.

5. The intake control system as claimed in claim 3, wherein the engine has a fixed-intake pressure operation mode in which the intake pressure is held at a fixed value by the throttle valve and the intake air amount is controlled by the lift of the intake valve, and wherein said correction means corrects the target intake air amount in the fixed-intake pressure operation mode.

6. The intake control system as claimed in claim 4, wherein the engine has a fixed-intake pressure operation mode in which the intake pressure is held at a fixed value by the throttle valve and the intake air amount is controlled by the lift of the intake valve, and wherein said correction means corrects the target intake air amount in the fixed-intake pressure operation mode.

7. An intake control system for an internal combustion engine comprising:
    a variable intake lift mechanism that adjusts an intake air amount by changing a lift of an intake valve;
    a throttle valve that is disposed in an intake passage, for adjusting intake pressure by changing an opening of said throttle valve;
    operating condition-detecting means for detecting operating conditions of the engine;
    target intake air amount-setting means for setting a target intake air amount serving as a target of the intake air amount according to the detected operating conditions of the engine;
    correction means for correcting the set target intake air amount such that a change in the target intake air amount is delayed;
    throttle valve opening-setting means for setting the opening of said throttle valve according to the corrected target intake air amount;
    lift-detecting means for detecting a lift of the intake valve;
    a variable intake cam phase mechanism for changing a cam phase of an intake cam that actuates the intake valve, with respect to a crankshaft, and
    cam phase-detecting means for detecting the cam phase, and
    wherein said correction means comprises: limit value-setting means for setting a limit value which is at least one of an upper limit value and a lower limit value of the target intake air amount according to the detected lift and cam phase of the intake valve, and limiting means for limiting the set target intake air amount based on the set limit value.

8. The intake control system as claimed in claim 7, wherein said correction means further includes averaging means for averaging the target intake air amount by averaging calculation.

9. The intake control system as claimed in claim 8, further comprising:
    target lift-setting means for setting a target lift that serves as a target of the lift of the intake valve, and feedback means for feedback-controlling the lift of the intake valve using a response characteristic value representative of a predetermined response characteristic, such that the lift of the intake valve becomes equal to the set target lift, and wherein said averaging means sets an averaging coefficient for the averaging calculation, using the response characteristic value.

10. The intake control system as claimed in claim 7, wherein the engine has a fixed-intake pressure operation mode in which the intake pressure is held at a fixed value by the throttle valve and the intake air amount is controlled by the lift of the intake valve, and wherein said correction means corrects the target intake air amount in the fixed-intake pressure operation mode.

11. The intake control system as claimed in claim 8, wherein the engine has a fixed-intake pressure operation mode in which the intake pressure is held at a fixed value by the throttle valve and the intake air amount is controlled by the lift of the intake valve, and wherein said correction means corrects the target intake air amount in the fixed-intake pressure operation mode.

12. The intake control system as claimed in claim 9, wherein the engine has a fixed-intake pressure operation mode in which the intake pressure is held at a fixed value by the throttle valve and the intake air amount is controlled by the lift of the intake valve, and wherein said correction means corrects the target intake air amount in the fixed-intake pressure operation mode.

* * * * *